R. HOLLINGSWORTH.
CAR UNLOADING SHOVEL.
APPLICATION FILED DEC. 17, 1910.
1,038,585.
Patented Sept. 17, 1912.
11 SHEETS—SHEET 7.
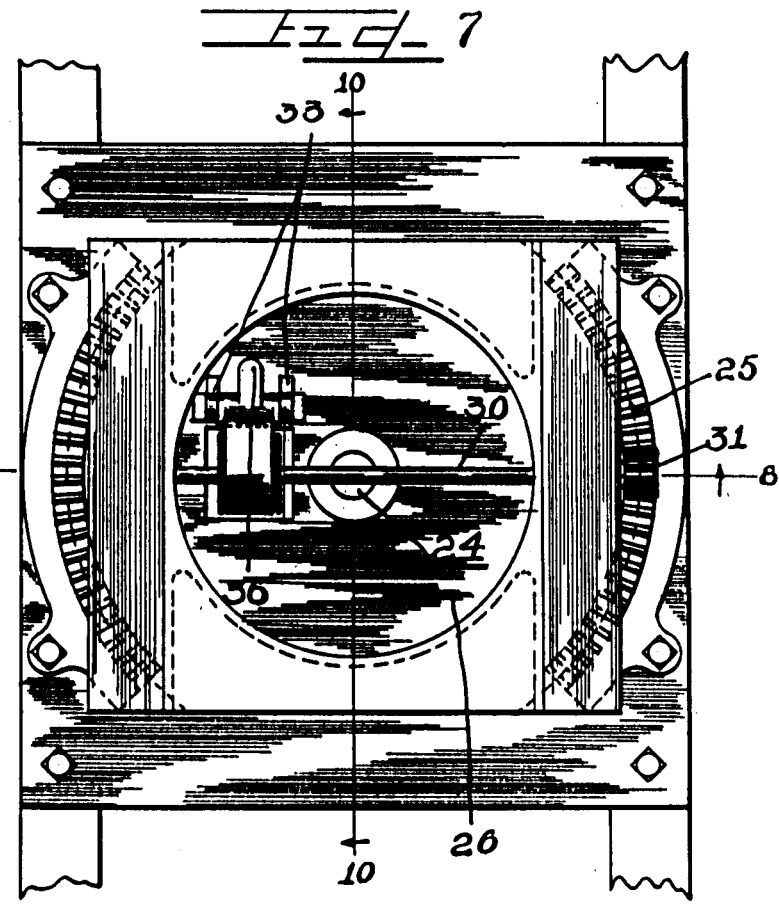
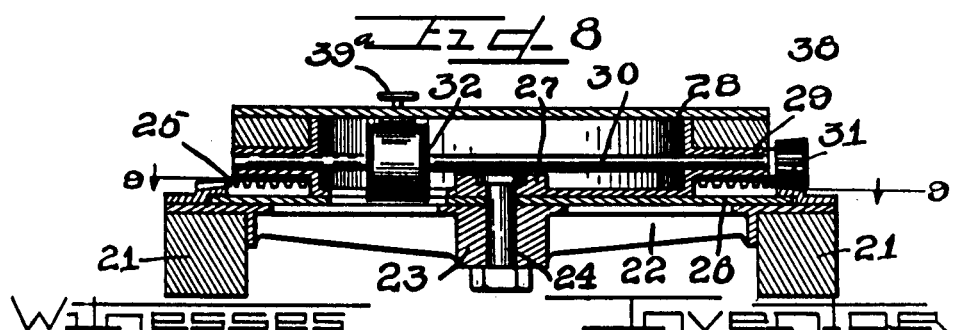
Witnesses
J. R. Angell
Charles W. Hills Jr.
Inventor
Rea Hollingsworth
by Charles W. Hills
Atty.

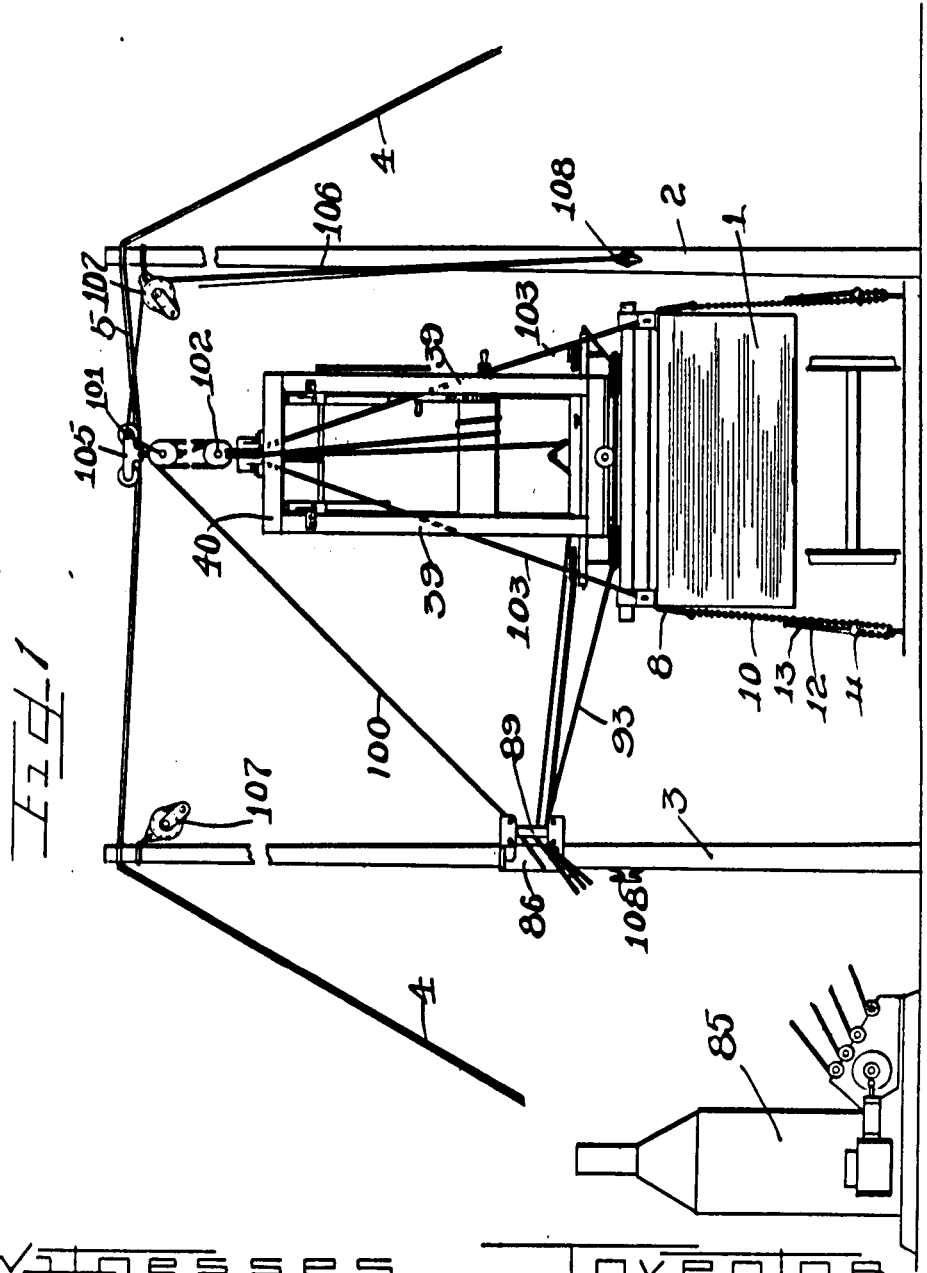

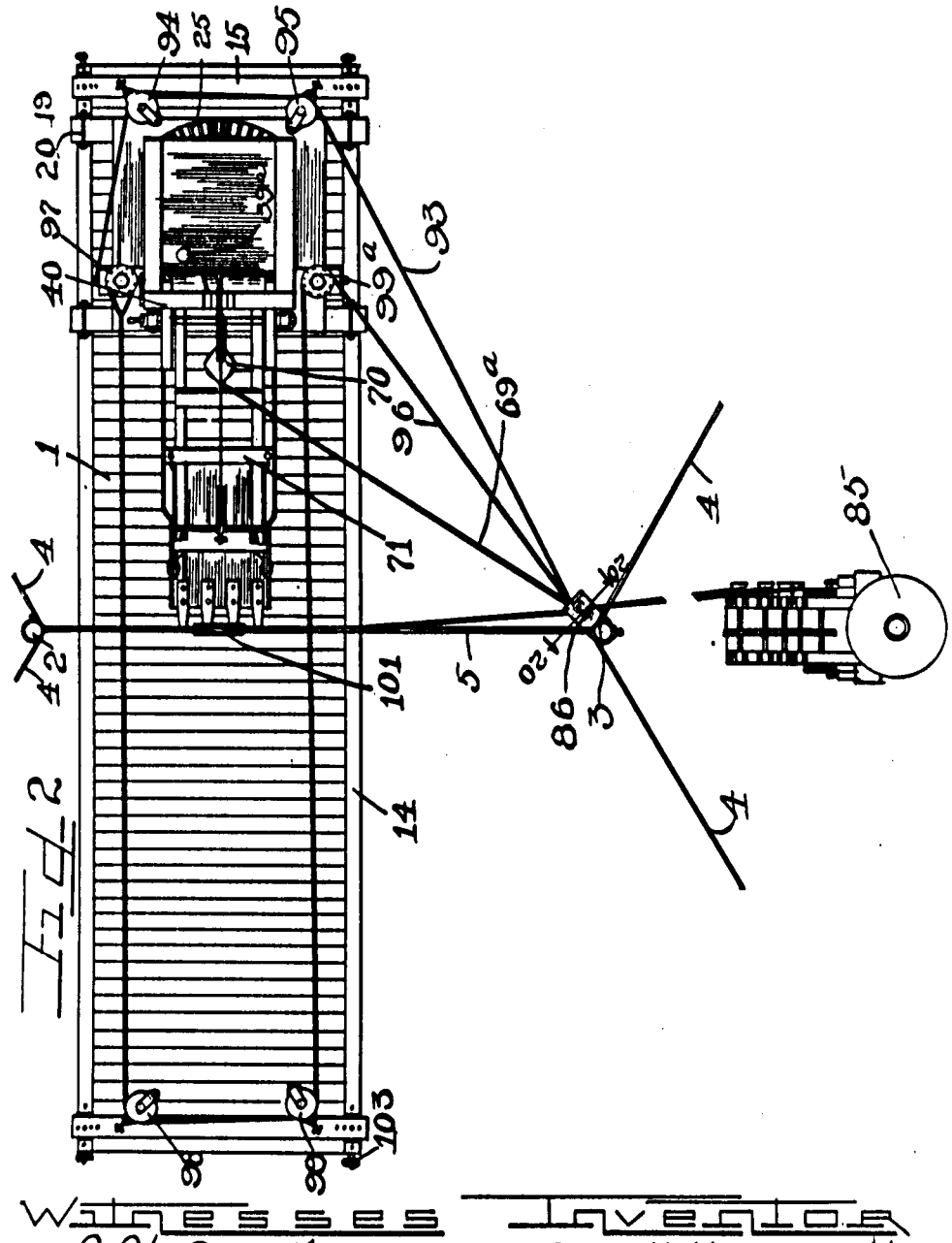

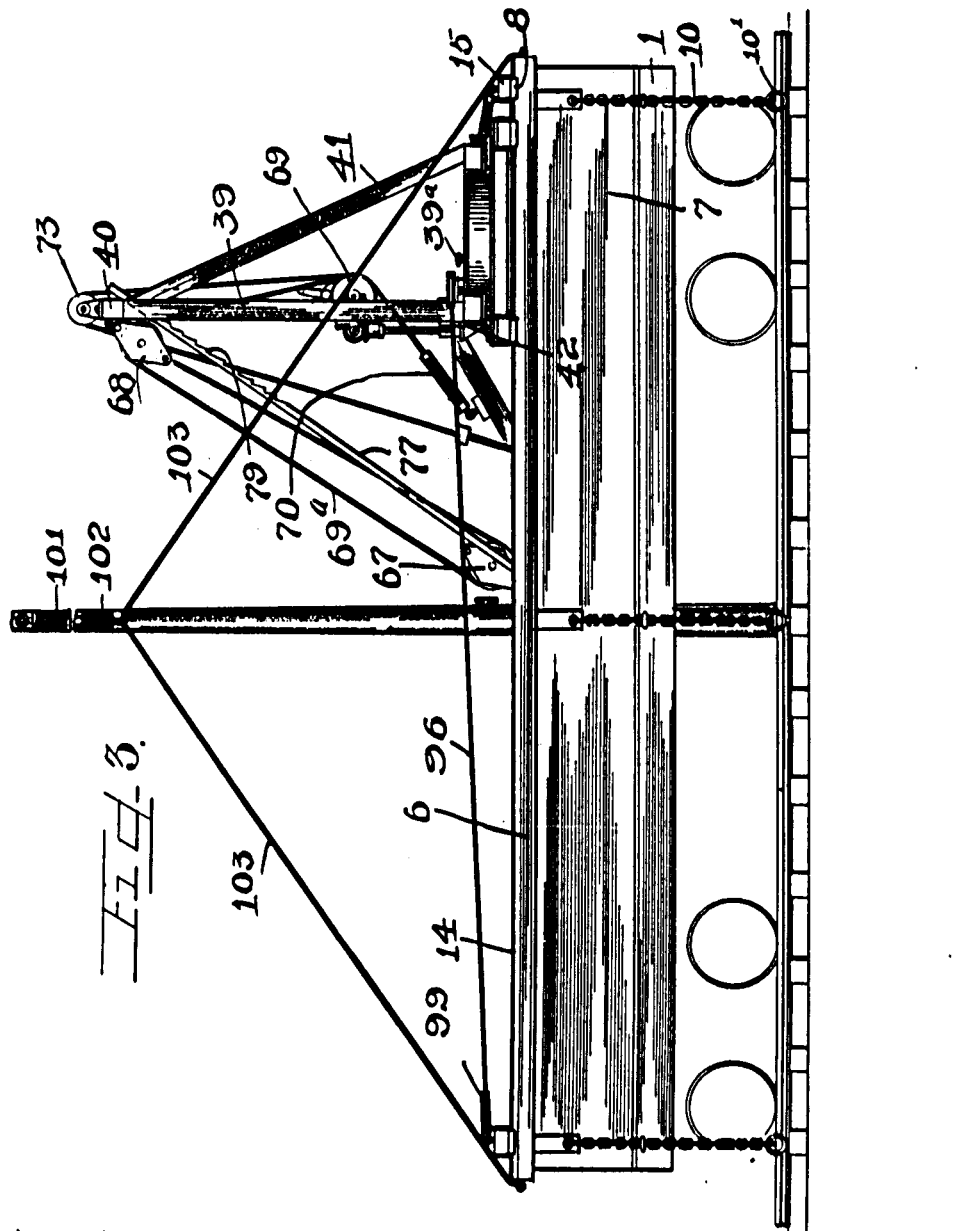

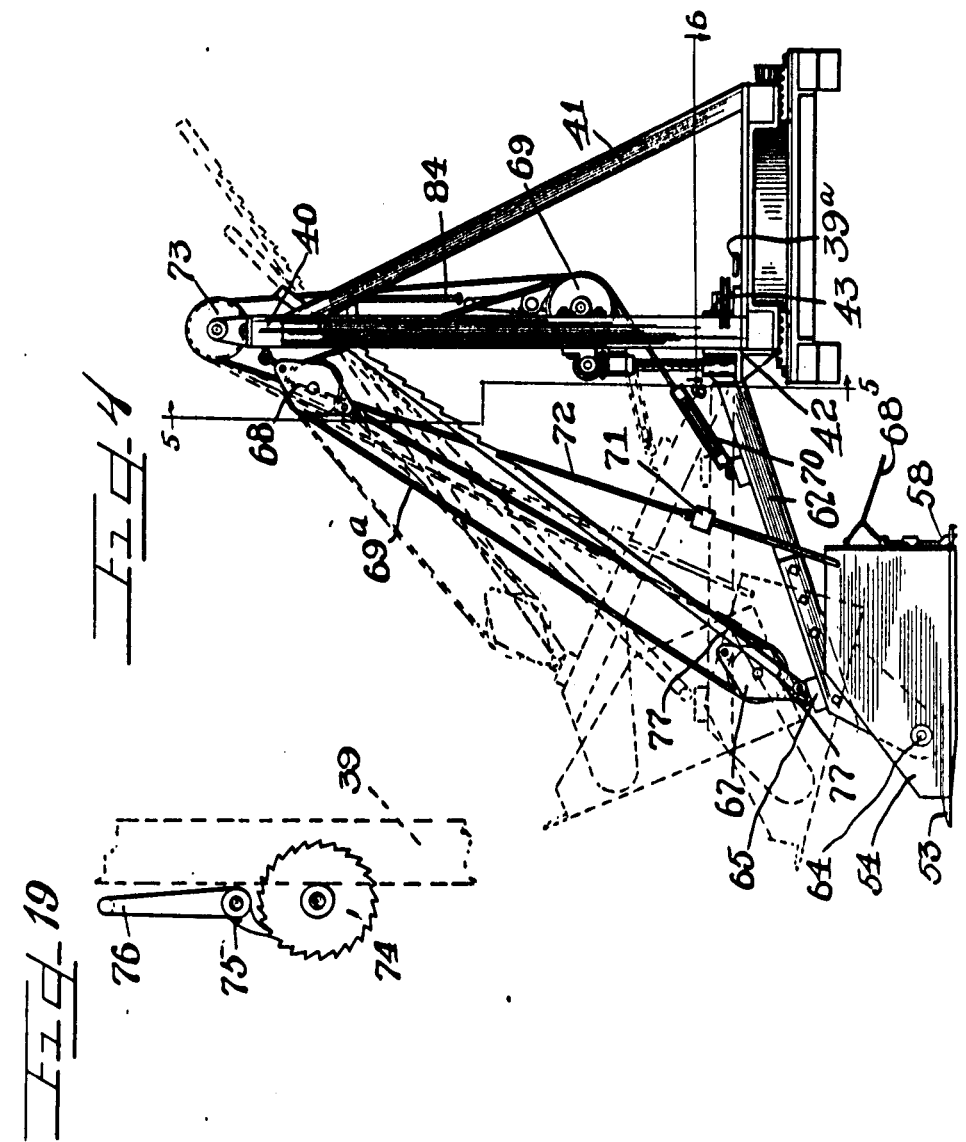

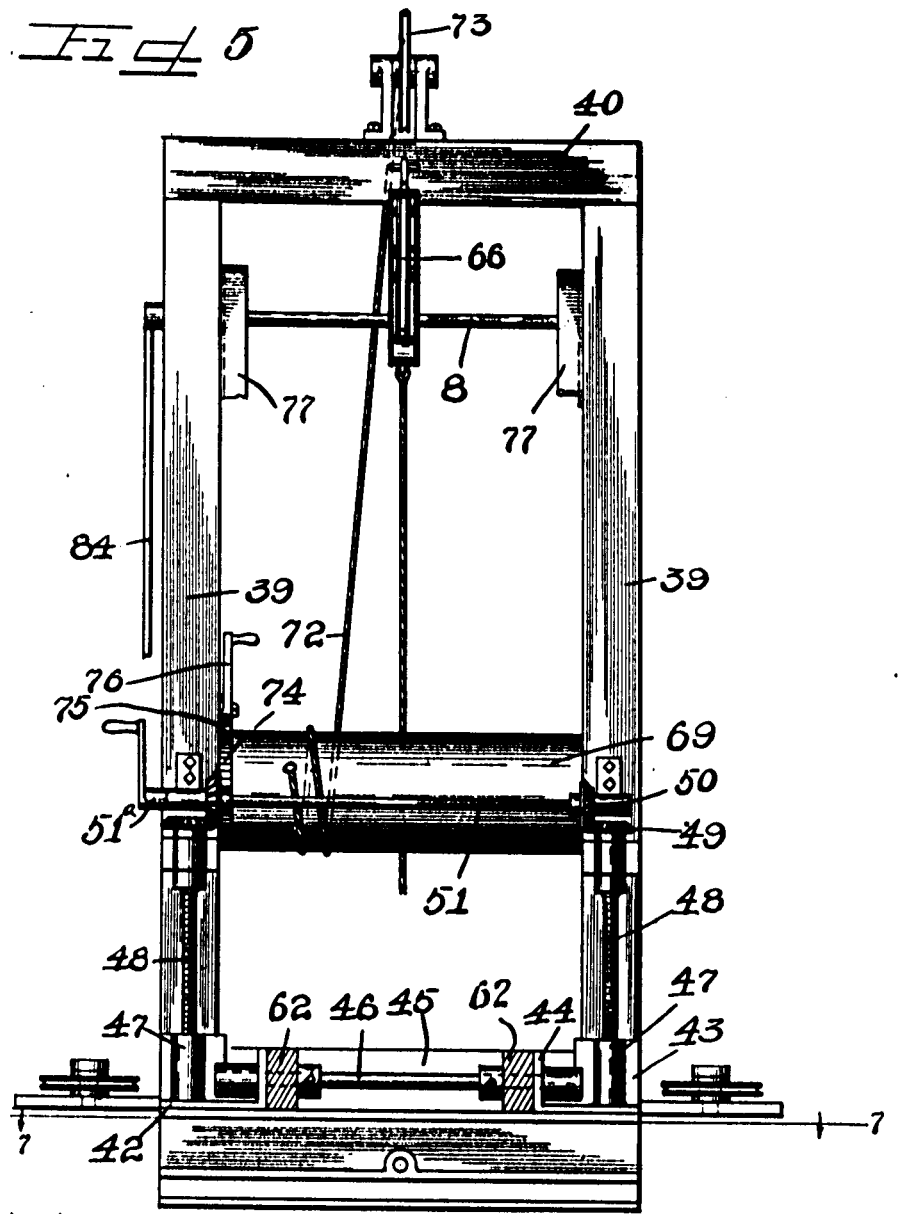

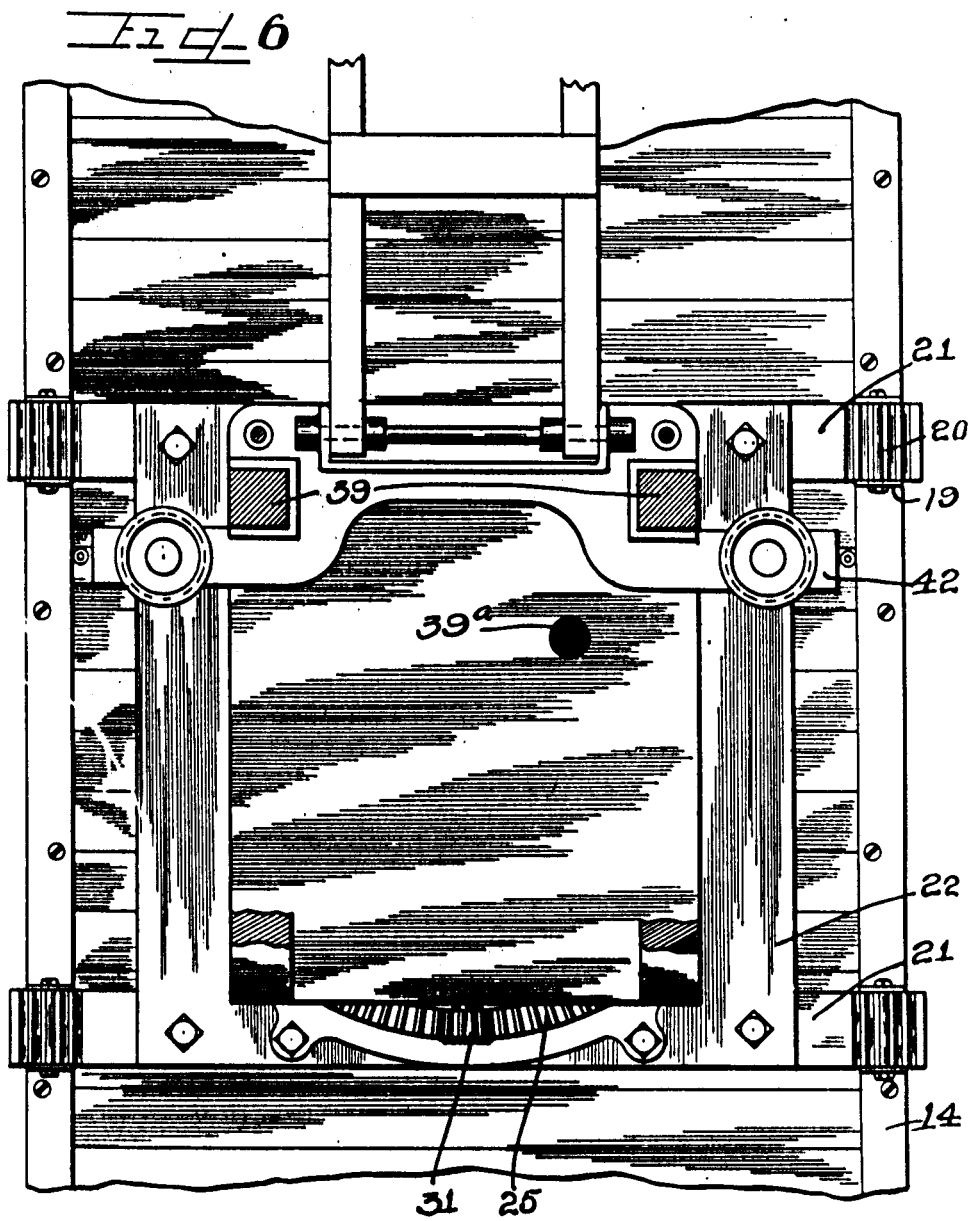

R. HOLLINGSWORTH.
CAR UNLOADING SHOVEL.
APPLICATION FILED DEC. 17, 1910.
1,038,585.
Patented Sept. 17, 1912.
11 SHEETS—SHEET 8.
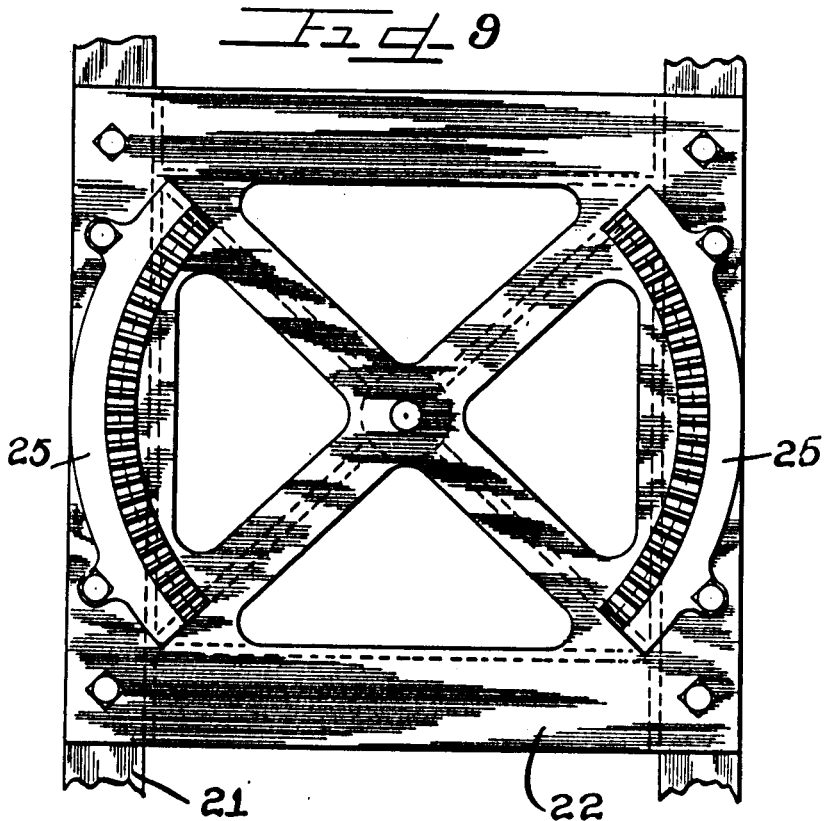
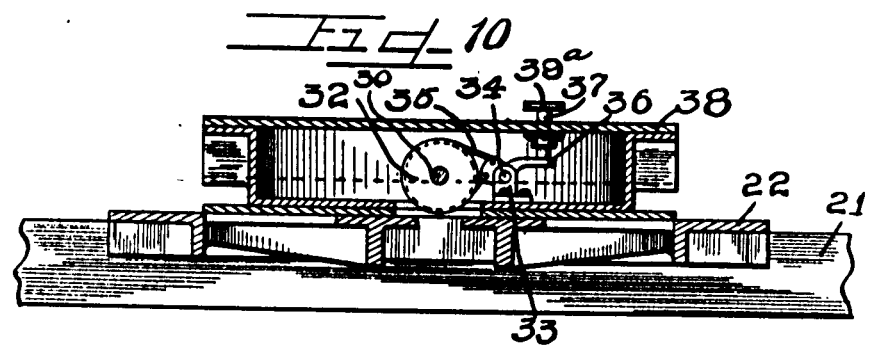

R. HOLLINGSWORTH.
CAR UNLOADING SHOVEL.
APPLICATION FILED DEC. 17, 1910.
1,038,585.
Patented Sept. 17, 1912.
11 SHEETS—SHEET 9.
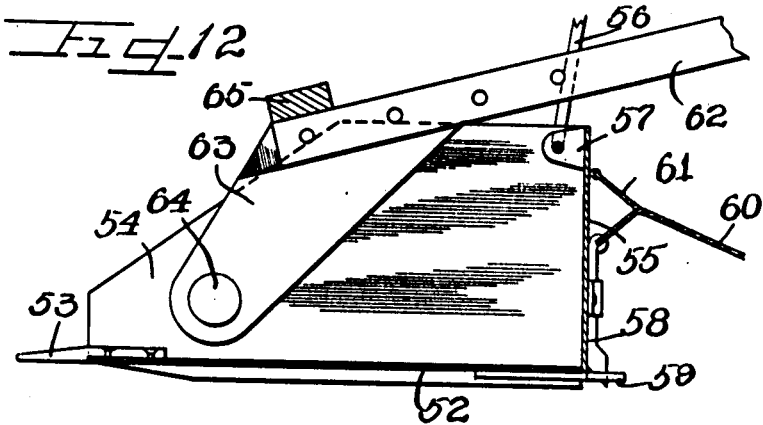
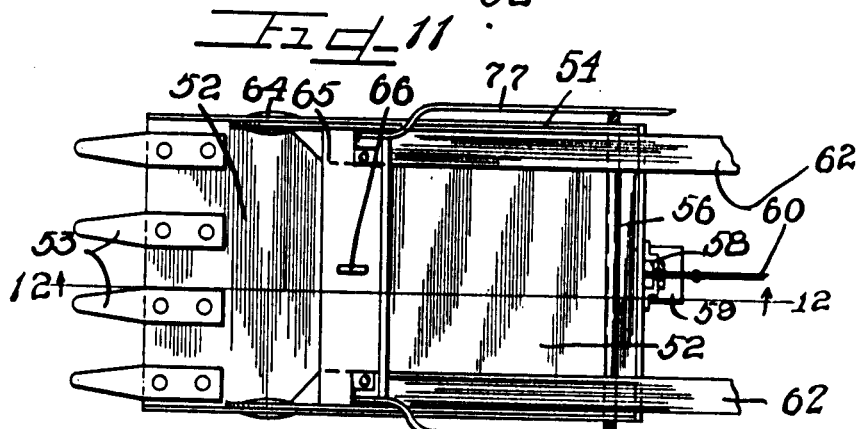
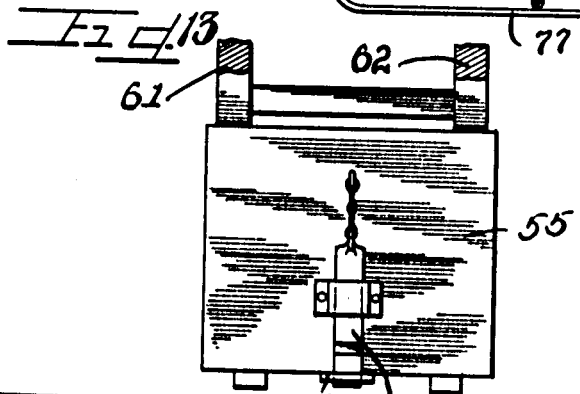

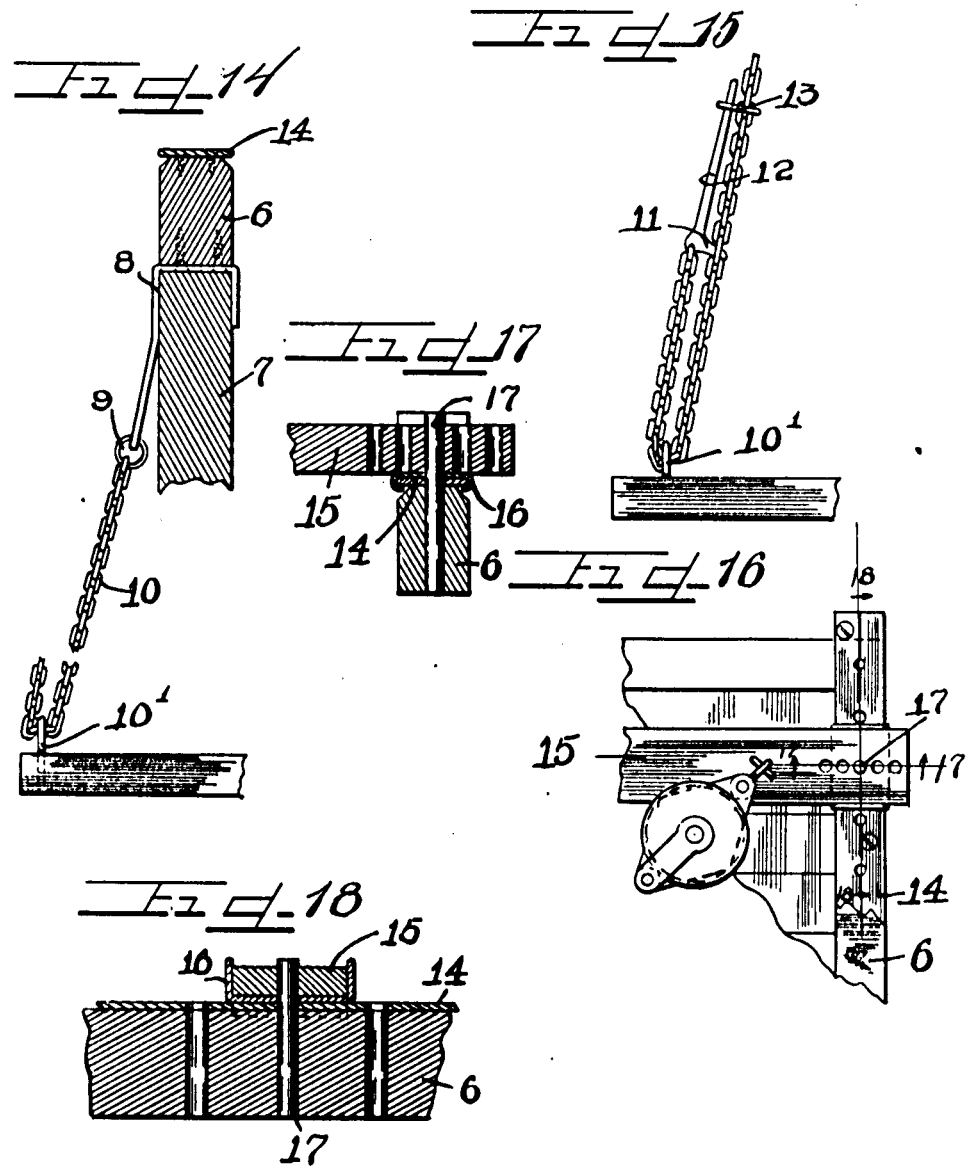

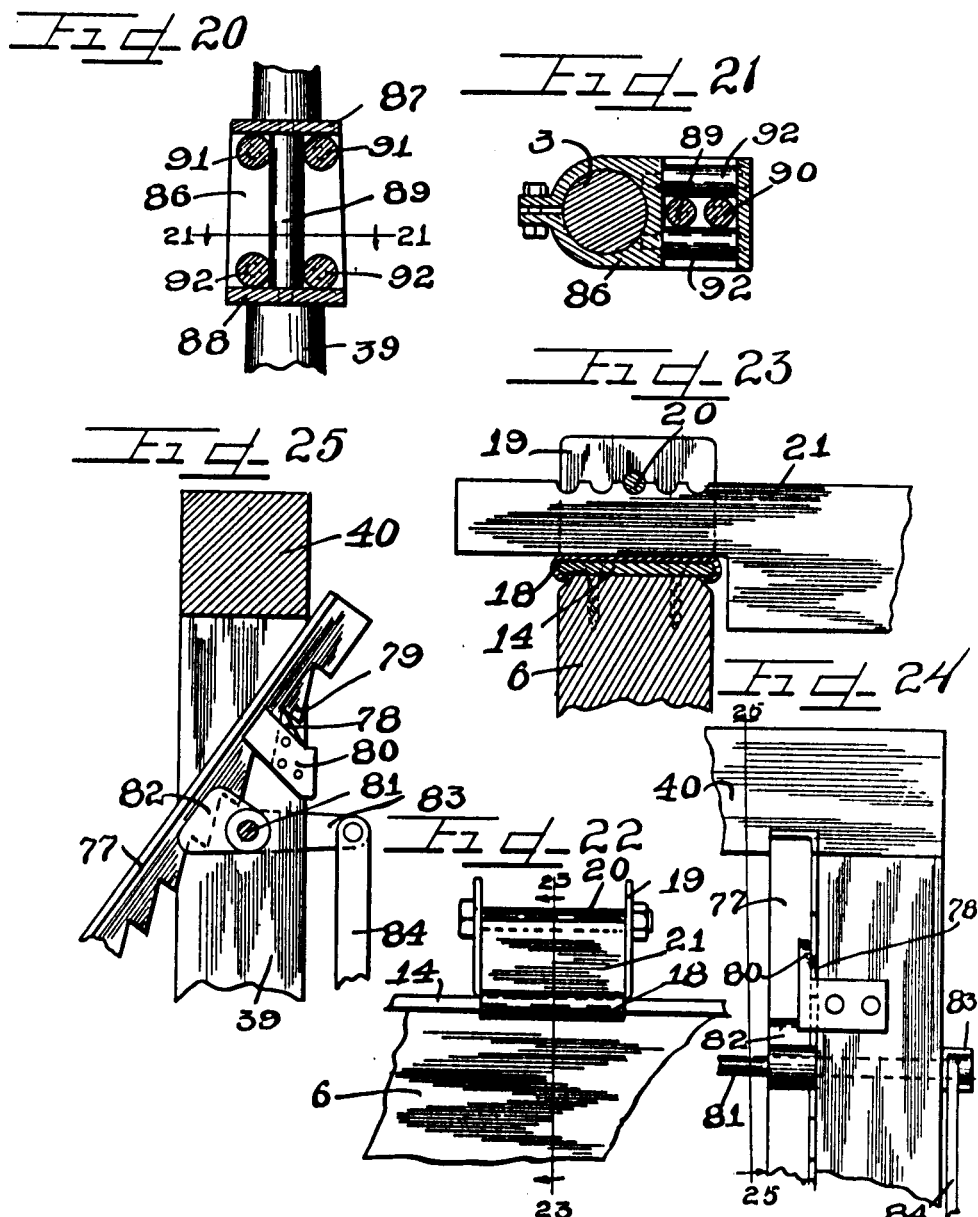

UNITED STATES PATENT OFFICE.

REA HOLLINGSWORTH, OF GRANT PARK, ILLINOIS, ASSIGNOR OF ONE-THIRD TO H. B. CRUM, OF CHICAGO, ILLINOIS.

CAR-UNLOADING SHOVEL.

1,038,585.　　　　Specification of Letters Patent.　　Patented Sept. 17, 1912.

Application filed December 17, 1910. Serial No. 597,826.

*To all whom it may concern:*

Be it known that I, REA HOLLINGSWORTH, a citizen of the United States, and a resident of the town of Grant Park, in the county of Kankakee and State of Illinois, have invented certain new and useful Improvements in Car-Unloading Shovels; and I do hereby declare that the following is a full, clear, and exact description of the same, reference being had to the accompanying drawings, and to the numbers of reference marked thereon, which form a part of this specification.

Many attempts have been made to provide mechanism for quickly and economically unloading gondola cars in situations where tipples are not available. Such devices have usually proved insufficient or unsatisfactory for the purpose for which designed owing to the size and weight of the same, and the difficulty in handling. Although attempts have sometimes been made to utilize power shovels for this purpose, such installations have usually required the use of an additional car and a track parallel to that of the car to be unloaded, and these conditions are not always attainable.

The object of this invention is to provide a power operated shovel adapted for temporary installation upon the car to be unloaded, and operated from a portable power plant conveniently located with reference thereto.

It is also an object of the invention to afford a construction and installation which permits ready shifting from one car to another and by the use of which the track may be quickly cleared for traffic, if desired.

The invention also has for its object an exceedingly compact and simple device for the purpose specified in which the shovel, although carried upon a very short dipper stick or frame, may be swung laterally of the car sufficiently to deposit well clear of the car.

It is also an object of the invention to afford in a device of the class described an improved bottom dump shovel whereby the discharge from the shovel may be delivered with accuracy to any suitable place of deposit or vehicle to receive the same.

It is also an object of the invention to afford a construction whereby the entire device may be quickly elevated from the car to permit the removal of the unloaded car and the positioning of a loaded car beneath the same.

It is an important object of the invention to accomplish the purposes above set forth with the least possible obstruction of track and a minimum expenditure for labor and power.

It is also an important object of the invention to afford a construction whereby the dipper may be moved longitudinally the car by means of suitable rigging for that purpose, and in which the device is at all times under perfect control during any of its operations.

The invention consists in the matters hereinafter described and more fully pointed out and defined in the appended claims.

In the drawings: Figure 1 is a rear end elevation of a device embodying my invention. Fig. 2 is a top plan view thereof with the lines broken away. Fig. 3 is a view in side elevation. Fig. 4 is an enlarged side elevation of a device showing the dipper swung laterally and the device removed from the car, and illustrates the operation in dotted lines. Fig. 5 is an enlarged section on line 5—5 of Fig. 4. Fig. 6 is an enlarged section on line 6—6 of Fig. 4. Fig. 7 is a section on line 7—7 of Fig. 5. Fig. 8 is a section on line 8—8 of Fig. 7. Fig. 9 is a section on line 9—9 of Fig. 8, with parts removed. Fig. 10 is a section on line 10—10 of Fig. 7. Fig. 11 is a top plan view of the bucket. Fig. 12 is a section on line 12—12 of Fig. 11. Fig. 13 is a rear elevation thereof, with the dipper frame broken away. Fig. 14 is an enlarged fragmentary detail illustrating one means for engaging the supporting sills for the machine on the car. Fig. 15 is an enlarged detail thereof. Fig. 16 is an enlarged fragmentary section illustrating the adjustable connection between the side and end sills of the machine to permit adaptation for different widths and lengths of gondolas. Fig. 17 is an enlarged section taken on line 17—17 of Fig. 16. Fig. 18 is a section taken on line 18—18 of Fig. 16. Fig. 19 is a fragmentary detail of a ratchet and pawl for the controlling drum. Fig. 20 is an enlarged section on line 20—20 of Fig. 2. Fig. 21 is a section on line 21—21 of Fig. 20. Fig. 22 is an enlarged fragmentary view in side elevation, of the sliding connection of the shovel table or frame on the side sills. Fig. 23 is a section on line 23—23 of Fig. 22. Fig. 24 is an enlarged fragmentary detail of the frame and the ratchet bar for the shovel. Fig. 25 is a section on line 25—25 of Fig. 24.

As shown in the drawings: the car, as indicated by 1, is an ordinary gondola car of any kind or construction. On each side of said car at about opposite the middle of the car, and at unloading position, are erected gin poles 2 and 3, which are guyed in upright position by means of side guy lines 4, as shown in Figs. 1 and 2, and are connected at the top by means of a main horizontal stay or cable 5, at a sufficient height above the track to permit standard traffic to pass beneath the same. One of said gin poles is positioned near the track while the other is at a sufficient distance from the track to permit the entire machine when supported on the main stay 5, to be moved laterally to clear the track for traffic, as shown in Figs. 1 and 2. Side sills 6, of a length equal to the length of the longest car to be unloaded, are secured one on each side the car on the side-boards 7, thereof. Said sills are provided at intervals in their length with sill hooks 8, rigidly secured by bolting or otherwise on the under side thereof, as shown in Figs. 3 and 14, and shaped to engage over the top of said side-board of the car, as shown in Fig. 14. Said hooks 8, are each provided with a ring 9, at the outer end thereof, with which is connected a chain 10, whereby the sills are secured to the track. For this purpose, the chains, as shown, are passed through eye bolts 10', secured each in the end of a tie and the end of a chain having passed through said eye bolt, is drawn upwardly and connected with a bent lever, one end 11, of which is secured in a link of said chain, and the other end 12, thereof is swung upwardly alongside the chain and secured thereto by means of a link 13, slidable on the chain, the end of the chain, of course, serving as the fulcrum for the lever. While I have shown eye bolts secured to the ties, as the means for attaching the chains thereto, of course, the attachment with the track may be otherwise effected, as, for instance, the attachment may be made direct with the rail, if preferred, or in any suitable manner to afford attachment with the sills 6, on the top of the car. The upper edges of the sills, 6, are chamfered or cut away on each side and secured on the top of each sill and extending for the length thereof is a metallic band 14, the edges of which project over the chamfered edges of the sills, as shown in Fig. 14. Said metal rails or bands afford ways upon which the shovel frame slides. Said side sills are provided from each end inwardly toward the middle with apertures extending vertically therethrough and arranged at short intervals apart, as shown in Fig. 10. End sills 15, extend transversely the car and rigidly connect said side sills at their ends, and, as shown, are also provided with apertures extending vertically therethrough, as shown in Figs. 16 and 17, and arranged at close intervals apart from the ends of said end sills inwardly toward the middle, and a shoe plate 16, comprising a plate of metal having the ends bent inwardly to engage around the rail or way 14, is mounted on said rail and provided with a central aperture therethrough to receive a bolt 17, which extends through one of the apertures in the end sills and in the side sill, as shown in Fig. 17, to bind the same firmly together. This construction permits the side and end sills to be adjusted to fit the width and length of any gondola car.

Clips or shoes 18, similar to the clips or shoes 16, slidably engage the ways 14, in pairs on each side the car, and are each provided at each end with upwardly extending plates or wings 19, each provided with an aperture therethrough to receive a bolt 20, as shown in Fig. 22. Resting in said clips on opposite sides of the car are transverse beams 21, provided with transverse notches or grooves near each end thereof, as shown in Figs. 6 and 23, to receive said bolt therein in any of the various adjustments as to width between the side sills. Rigidly bolted on said beams 21, is a frame or base plate 22, as shown rectangular in form and provided with a central downwardly projecting hub 23, apertured to receive a king bolt 24, therethrough. Bolted on said plate 22, on opposite ends thereof and over the beams 21, are geared segments 25, arranged oppositely and equal distances from the center or hub of said plate. Said segment is recessed on the inner edge beneath the teeth to receive therein the plate 26, through which the king bolt also extends, and mounted on said plate and rigidly secured thereto by bolting or otherwise, is the revolving table for the dipper. Said revolving table, as shown, embraces a substantially circular casting having a broad bottom plate 27, apertured to receive the king bolt therethrough, as shown in Fig. 8, and having peripheral side walls 28, provided on opposite sides thereof with apertured bosses 29, in which is journaled a shaft 30, extending diametrically across the table above the king bolt, as shown in Fig. 7, and on the outer end of which is a pinion 31, which meshes with one of the geared segments, as shown in Figs. 7 and 8. Rigidly secured on said shaft within said frame, is a pulley or band wheel 32, and mounted upon the floor of the table are brackets 33, having journaled between the same a shaft 34, carrying a bent lever, one end of which is cam shaped and provided on opposite sides with shafts or rods, to which the opposite ends of a friction band 35, is engaged, as shown in Fig. 10. The other end 36, of said lever extends oppositely from said band wheel or pulley 32, and is engaged by a rod 37, which extends through the filler 38, on said revolving table, and is provided on its upper end with a foot piece 39ª, whereby downward pressure from the foot of the operator acts to rigidly hold the revolving table from movement by means of the frictional engagement of the friction band 35, on said band wheel or pulley 32.

Mounted on the front side of the revolving table near each corner thereof, are uprights 39, connected at their top by a cross bar or beam 40, and secured at each rear corner of said table is an upwardly and forwardly inclining brace bar 41, rigidly engaged at the top of the frame so formed. A vertically adjustable carriage 42, which may be constructed of cast metal, is slidably mounted upon the uprights 39, and provided at each end with upwardly projecting flanges 43, surrounding a recess in each end complemental with the transverse section of each of the posts or uprights 39, and affording guide bearings on said posts. Upwardly directed parallel lugs 44, are provided on said carriage between said posts, as shown in Figs. 5 and 6, which may be connected by an integral web 45, at the rear end thereof, which serves also to stiffen the plate affording said casting, and extending through said lugs 44, is a shaft 46, upon which the dipper frame is pivotally mounted at its inner end.

Means are provided for adjusting said carriage vertically upon the post 39, of the shovel frame. For this purpose, as shown, an apertured and internally threaded boss 47, is provided on said carriage, in advance of each post, and threaded therein is a screw shaft 48, at its upper end provided with a bevel pinion 49, which meshes with the complemental bevel pinion 50, secured on a shaft 51, journaled transversely on said post 39. Said shaft 50, is provided at its outer end with a crank 51ª, by rotation of which in one direction said carriage is elevated and in the opposite direction, of course, adjusted downwardly.

The dipper comprises a fixed bottom 52, provided with forwardly projected fingers or teeth 53, secured thereon in a familiar manner, and side walls, 54, rigidly connected with the bottom for their entire length and tapered toward the front end. The rear end or back wall 55, for the dipper is hinged at its top on a transverse shaft 56, on the lugs 57, which are secured at the top of said back wall and project inwardly and are apertured to engage on said shaft. A latch bolt 58, is slidably secured on the hinged rear end wall of the dipper and adapted to engage in a suitable latch plate 59, rigidly secured on the bottom and projecting rearwardly a sufficient distance to receive the bolt 58, and, as shown, said bolt on its forward side is inclined to rise over the end of said latch plate when said rear wall swings to closed position, as shown in Figs. 11 to 13, inclusive. A trip line 60, for said bolt 58, is secured in the upper end of said bolt and leads rearwardly to the operating position on the table and connected in said line near the bolt is a branch line 61, connected near the top of the door so that a pull on said trip line 60, acts to raise the bolt, as shown in Fig. 12. The dipper is pivotally supported near its front end and below the middle on a dipper frame comprising side frame members 62, which are mounted at their rear ends on the shaft 46, before described. Said side frame members may be rigidly connected together in any suitable manner and at their forward ends are provided with downwardly and forwardly extending side plates 63, which extend inside the bucket, as shown in Fig. 12, and are pivotally engaged to the side walls thereof by means of headed bolts or rivets 64.

Rigidly connecting the front ends of the side members of the dipper frame, is a rail or bar 65, provided centrally with an eye 66, to receive the hook of the sheave 67, and secured on the top cross beam 40, of the main frame on the forward side thereof is an eye in which engages the hook with the sheave 68. These sheaves may be single blocks. A hoisting line 69ª, is secured at one end on the lower end of the block for the sheave 68, passes around the sheave 67, around the sheave 68, thence rearwardly and downwardly around a friction or tension roller 69, journaled on the rear side of the post 39, affording the main frame, and thence forwardly between the post and around the sheave 70, mounted on the dipper frame, as shown in Figs. 3 and 4, and thence laterally and thence directly or indirectly to the source of power, as hereinafter more fully described.

The shaft 56, upon which the rear door or wall of the bucket 55, is supported, is bent upwardly at each side the bucket and provided above the dipper frame with a cross bar 71, to which is connected one end of a line 72, which is trained over a fixed sheave 73, at the top of the main frame, whence it is led downwardly and is passed one or more times around the tension or friction roller 69, before described, and the end thereof secured on said roller, as shown in Fig. 5. As shown, said friction or tension roller 69, is provided at one end with a ratchet wheel 74, rigidly secured thereon, and a pawl 75, is pivotally mounted on one of the posts 39, and provided with a lever 76, whereby the pawl may be lifted from the ratchet wheel. Said lever is so related with the pawl as to permit the pawl to act by gravity, if desired.

Means are provided for positively supporting the bucket in elevated position on the main frame independent of the hoisting line. For this purpose, as shown, a ratchet bar 77, is pivotally engaged on the hoisting bar 65, and extends upwardly along the inner side of each of the posts 39, as more clearly shown in Figs. 24 and 25, the lower edge thereof sliding over a rigid tooth or detent 78, rigidly secured on each of said posts. Said ratchet bars, as shown, are constructed of angle steel or the like, and the downwardly directed webs, which lie flat against the posts 39, are provided in their lower edges with downwardly directed ratchet teeth 79, which are confined to said teeth or detent 78, by means of a guide plate 80, bolted on said post outside said detents 78. A shaft 81, is journaled between said posts and is provided in position to engage the flanges of the ratchet bars, as shown in Figs. 24 and 25, with a cam head 82, rigidly secured thereon. Said shaft is provided at one of its extremities with an arm 83, which extends rearwardly and pivotally connected with the rear end of which is an actuating rod 84, which extends downwardly into convenient proximity with the operator when standing on said table, the construction being such that downward pull on said actuating rod 84, by the operator serves to elevate the ratchet bars to clear the detents 78.

Any suitable hoisting engine may be employed. For convenience and to avoid confusion in the representation of the lines or cables, I have shown a conventional hoisting engine 85, having four hoisting drums, though obviously this is not essential. Conveniently and preferably guide rollers are mounted on the gin pole 3, to direct said cables fairly to the drums of the hoisting engine. For this purpose, a collar 86, is rigidly clamped on said gin pole, as shown more clearly in Figs. 1, 2, 20 and 21, and is provided on its side adjacent to the machine with outwardly projecting top and bottom plates 87 and 88, which are provided with inwardly directed flanges at their extremities and in which are journaled parallel inner and outer vertical rollers 89 and 90, and upper and lower horizontal rollers 91 and 92, on each side of the vertical rollers. The end of the line 69ª, from the sheave 70, leads between the rollers 91 and 92, and the vertical rollers 89 and 90, and thence downwardly to the appropriate drum of the hoisting engine. A line 93, is secured in a suitable eye in the end of the carriage 42, on the opposite side of the machine from the hoisting drum and thence is led through snatch blocks 94—95, secured on the rear end sill, thence between the rollers 89 and 90, as before described, and to the hoisting drum. In a similar manner a line 96, is looped at one end and engaged over a sheave 97, on the opposite side of the frame from the hoisting engine, thence leads forwardly through a snatch block 98 and 99, on the front cross sill, thence leads between the rollers 89 and 90 before described, and to the hoisting engine. A line 100, leads through a block 101, supported by a carriage 105, on the main horizontal stay 5, on the gin pole and through a block 102, as shown in Figs. 1 and 2, the latter of which engages hoisting lines 103, as shown in Figs. 1 and 8, two in number, and which are connected at their ends on the ends of the side sills. Said blocks 101 and 102, may be of any suitable kind, and are shown as double blocks and the hoisting line 100, leads therefrom between the rollers 89 and 90, and thence to the hoisting engine, as before described. As shown in Fig. 1, a snub line 106, is attached to the carriage 105, and passed through either of the snatch blocks 107, on the upper ends of the gin poles 2 and 3, and then secured on cleats 108, on said gin poles.

The operation is as follows: The machine may be assembled on the ground in the space between the track and the gin pole 3, and then hoisted on the car by means of the blocks 101—102, and hoisting line 100, or may be assembled on the car in the first instance. The side sills are, of course, adjusted the required distance adapted to fit on the side-boards of the car and the end sills are secured thereto as before described appropriately, and this adjustment is readily facilitated by the arrangement of holes at the ends of said sills which are so arranged as to adapt the adjustment for any of the standard gondola sizes. The machine having been assembled in position, it is drawn as far as possible to the rear end of the car, as for instance, to the position shown in Fig. 2, of the drawings, the dipper previously supported upon the ratchet bars in any of the positions indicated in dotted lines in Fig. 4, is then dropped into loading position, as shown in full lines in said figure by the release of said ratchet bars from their detents by the operator pulling upon the actuating rod 84. In this position the machine as a whole is drawn forwardly to draw the dipper into the work, for this purpose the line 96, being utilized and the operator holding the dipper from swinging on its table by applying his weight upon the footpiece 39ª. When said dipper has been drawn sufficiently into the work or simultaneously with such forward movement, the line 69ª, is applied to the hoisting drum, the effect being if the operator still holds said table from turning, to elevate the dipper, and the operator having released the detent from the friction drum 69, the dipper swings to the position shown in the upper dotted lines in Fig. 4. If now the operator releases pressure upon the foot-piece 39ª, thereby releasing the friction band from the pulley 32, the draft of the line through the sheave 70, swings the dipper toward the hoisting engine and to dumping position. With the upward movement of the dipper, the ratchet bars have, of course, slid upwardly over the detents therefor on the frame to the position shown in dotted lines in Fig. 4, and support the dipper during the lateral swing thereof to dumping position, and after the release of the line 69ª, on the hoisting drum, continue to support the dipper until it is returned over the car. The reverse movement is accomplished by means of the line 93. The dipper is now supported over the car in the position shown in any of the dotted lines shown in Fig. 4. The actuating rod 84, is now operated to release the ratchet bars and thereupon, inasmuch as there is no tension upon the cable 69ª, the front end of the dipper drops down to loading position and at the same moment, the pawl being released, the rear end of the dipper drops down substantially to bring the bottom of the bucket in substantially horizontal position, and the forward and filling movement again occurs as before described. This operation is continued until all the material in the car has been removed in advance of the dipper. Thereupon, the lines 69ª, and 96, are cast off from the sheave 70, and the snatch blocks 97, 98, 99, and 99ª, on the forward corner of the revolving frame, and draft being applied to the line 93, the machine is operating through the snatch blocks 94 and 95, the revolving table is turned half around so that the shovel faces toward the opposite end of the car. The line 96, is then engaged through the snatch blocks 94 and 95, and the loop end thereof engaged on the fixed sheave 99ª, on the frame while line 93, is connected at its end with a suitable eye at the opposite end of the carriage from where it had formerly been connected and is led through the snatch blocks 98 and 99, and thence between the guide rollers 89 and 90, to the hoisting drum. Of course, the line 69ª, is again passed through the sheave 70, and thence carried between the leading rollers 89 and 90, to the hoisting drum. The operation is now continued as before until the car is entirely unloaded. When this has been accomplished, the chains previously connecting the sills with the track are released, and the entire machine is hoisted on the blocks 101 and 102, by means of the line 100, and is so supported until another loaded car has been positioned beneath the same, whereupon it is dropped into position upon the car and the operation proceeds as before. Should it be necessary to clear the track for traffic, it may be promptly accomplished by releasing the lines from the drums and guide sheaves and putting the ends of the lines aboard the car when the car may be switched with the machine mounted thereon, or the track may be cleared by hoisting the machine on the main horizontal stay as before described and swinging the same into close proximity with the gin pole 3, the snub line 107 is then pulled tight and secured to the cleat 108, and prevents the carriage 105, from returning to the center of the main stay 5, until so desired. This affords sufficient clearance to permit the passage of trains and permits the machine to be quickly restored into operative position.

Of course, I am well aware that numerous details of the construction may be varied, the particular arrangement of lines not being essential, as the lines may be arranged in other ways to effect the same results. Other details of the construction may be readily varied. I have shown but one of several installations and constructions embodying my invention, and I therefore do not purpose limiting the patent for this invention otherwise than necessitated by the prior art.

I claim as my invention:

1. A car unloading device embracing parallel ways adapted to be secured to the car top, a revolving platform slidably engaged thereon to move the length thereof, a power shovel slidably carried thereon to operate in the car, a gin pole on each side of the car and tackle carried on said gin poles for elevating the power shovel and its ways above the car.

2. A car unloading device embracing parallel ways adapted to be secured to the car top, a rotatable platform slidably engaged thereon to move the length thereof, a power shovel frame and its shovel slidably carried thereon to operate in the car, a gin pole on each side of the car, tackle carried thereon acting to elevate the power shovel and its ways above the car, an independently supported hoisting engine, and cables leading thereto for operating the shovel.

3. A car unloading device of the class described embracing parallel ways detachably secured to the car top and attached to the track, a power shovel slidably carried thereon to operate in the car, uprights on each side the car, connecting means between said uprights at the top thereof and tackle carried on said connecting means acting to elevate the power shovel and its ways above the car and move the same laterally to clear the track.

4. A car unloading device of the class described embracing parallel ways adapted to be secured to the car top, a power shovel slidably carried thereon to operate in the car, uprights on each side the car, one of the same a distance from the track more than a car width, connecting means between said uprights at the top thereof and tackle carried on said connecting means acting to elevate the power shovel and its ways above the car and to swing the same toward the remote upright.

5. A car unloading device embracing parallel ways, adapted to be rigidly but removably secured on each side the car, a revolving platform slidably engaged thereon to move the length thereof, a power operated shovel carried on said paltform, a hoisting engine positioned beside the car, tackle operated thereby for moving said platform on its ways, other tackle for revolving the platform, and means for elevating and supporting the machine as a whole clear of the car.

6. A car unloading device embracing parallel ways adapted to be rigidly but removably secured on each side the car, a revolving platform slidably engaged thereon to move the length thereof, a power operated shovel carried on said platform, an independently supported hoisting engine, tackle operated thereby for moving said platform on its ways, other tackle for revolving the platform, and means for elevating, supporting and swinging the machine as a whole clear of the car.

7. An unloading device embracing parallel ways, adapted to be rigidly but removably secured on each side the car, a revolving platform slidably engaged thereon to move the length thereof, a power operated shovel carried on said platform to operate in the car, an independently supported hoisting engine, tackle operated thereby for moving said platform on its ways, other tackle for revolving the platform and for operating the shovel, and means for elevating and supporting the machine as a whole clear of the car.

8. An unloading device embracing parallel ways, adapted to be rigidly but removably secured on each side board of a gondola car, means attaching the same to the track, a revolving platform slidably engaged thereon to move the length of the ways, an upright frame on said platform, a power operated shovel carried thereon, an independently supported hoisting engine, tackle operated thereby for moving said platform on its ways, tackle for revolving the platform, tackle for operating the shovel, and means for elevating and supporting the machine as a whole clear of the car.

9. A car unloading device embracing parallel ways hooks thereon to engage over the side-boards of a gondola car, means engaging the ways in place, a revolving platform slidably engaged on said ways to move the length thereof, a power operated shovel carried on said platform, tackle operated thereby for moving said platform on its ways, tackle for revolving the platform, tackle for operating the shovel, means for elevating and supporting the machine as a whole clear of the car, and a hoisting engine for operating the tackle.

10. In a device of the class described side sills affording ways, end sills adjustably connecting said side sills at their extremities and adjustable thereon to vary the length and the width of the frame thus formed, a power shovel mounted upon the side sills to slide thereon, a hoisting engine, tackle operated thereby for shifting the shovel on said ways for operating the shovel and for swinging the same, and means elevating the machine as a whole.

11. In a device of the class described side sills affording ways, end sills connecting said side sills near their extremities and adjustable thereon to vary the length and the width of the frame thus formed, a power shovel mounted upon the side sills to slide thereon, an independently supported hoisting engine, tackle operated thereby for shifting the shovel on said ways, for operating the shovel and for swinging the same, and means elevating the machine as a whole.

12. In a device of the class described side sills affording ways, end sills connecting said side sills at their extremities and adjustable thereon to vary the length and the width of the frame thus formed, a frame mounted to slide upon the side sills, a rotatable platform thereon, a brake acting to lock said platform on said frame and embracing racked segments on the frame, a pinion on the platform, releasable means acting to hold the pinion from rotation, a power shovel carried on said platform, a hoisting engine, and tackle operated thereby for shifting the frame on said ways, for operating the shovel and for swinging the same.

13. In a device of the class described side sills affording ways, end sills connecting said side sills at their extremities and adjustable thereon to vary the length and the width of the frame thus formed, a frame mounted to slide upon the side sills, a rotatable platform thereon, a brake acting to lock said platform on said frame and embracing racked segments on the frame, a pinion on the platform, releasable means acting to hold the pinion from rotation, a power shovel carried on said platform, a hoisting engine, tackle operated thereby for shifting the frame on said ways, for operating the shovel and for swinging the same, and means operated from the hoisting engine for elevating the device as a whole from the car.

14. In a device of the class described side sills affording ways, end sills adjustably connecting said side sills at their extremities and adjustable thereon to vary the length and the width of the frame thus formed, a power shovel mounted upon the side sills to slide thereon, a hoisting engine, tackle operated thereby for shifting the shovel on said ways, for operating the shovel and for swinging the same, means elevating the machine as a whole, and releasable means independent of the hoisting engine for supporting the shovel in elevated position.

15. A machine of the class described embracing side sills or ways adapted to be secured on each sideboard of a car, end sills adjustably connecting the same, hooks secured on each side sill to engage the same in place on the car side, tackle on said hooks rigidly engaging said side sills from lifting, a frame slidably mounted on said ways, a rotatable table mounted on said frame, a dipper carried on and operated from said rotatable table, tackle connected with the frame and sills to move the frame longitudinally thereof, other tackle connected with the dipper to elevate the dipper and move the same laterally to dumping position, tackle engaged on the rotating table to return the dipper to filling position, and an independently supported hoisting engine for operating the tackle.

16. A machine of the class described embracing side sills or ways adapted to be secured on each sideboard of a car, end sills adjustably connecting the same, hooks secured on each side sill to engage the same in place on the side of the car, means rigidly engaging each hook acting to hold the sills from lifting, a frame slidably mounted on said ways, a rotatable platform mounted on said frame, a dipper carried on and operated from said rotatable platform, tackle connected with the frame and sills to move the frame longitudinally thereof, other tackle connected with the dipper to elevate the dipper and move the same laterally to dumping position, tackle engaged on the rotating table to return the dipper to filling position, means acting to lock the platform on the frame, and a hoisting engine for operating said tackle.

17. A machine of the class described embracing side sills or ways adapted to be secured on each sideboard of a car, end sills adjustably connecting the same, means holding said sills from lifting, a frame slidably mounted on said ways, a rotatable platform mounted on said frame, a rack on one, a pinion carried on the other, releasable means holding the pinion from movement to lock the platform on the frame, a dipper carried on and operated from said rotatable platform, tackle connected with the frame and sills to move the frame longitudinally thereof, other tackle connected with the dipper to elevate the dipper and move the same laterally to dumping position, tackle engaged on the rotating platform to return the dipper to filling position, a hoisting engine for operating the tackle, and tackle also operated by the engine for lifting the machine from the car.

18. A machine of the class described embracing side sills or ways adapted to be secured on each sideboard of a car, end sills adjustably connecting the same, clamps secured on each side sill to engage the same in place on the side of the car, tackle for rigidly engaging said sills from lifting, a frame slidably mounted on said ways, a rotatable platform mounted on said frame, means releasably locking the platform to the frame, a dipper carried on and operated from said rotatable platform, a hoisting engine non-supported upon the machine, tackle connected with the frame and sills to move the frame longitudinally thereof, other tackle connected with the dipper to elevate the dipper and move the same laterally to dumping position, tackle engaged on the rotatable platform to return the dipper to filling position, a gin pole on each side of the machine, tackle connected therewith for lifting the machine and lead sheaves on one of the gin poles through which the cables are led to the engine.

19. A machine of the class described embracing side sills or ways adapted to be secured on each sideboard of a car and provided with apertures extending vertically therethrough and at different distances from the ends, end sills also provided with a plurality of apertures through the ends thereof to register with those in the side sills, bolts extending through the registering apertures in said sills to adjustably connect the same to suit the size of the car to which to be applied, and clamps secured on each side sill.

20. In a device of the class described a rotating table, an upright frame thereon, a carriage slidably mounted on said upright frame, a dipper stick or frame pivotally mounted on said carriage at one end, a rear dumping dipper mounted near its front end on said stick or frame, means adjusting the rear end of the dipper relatively of the front end thereof, tackle for operating the dipper, means releasably supporting the dipper independent from said tackle embracing one or more bars pivotally engaged near the forward end of the dipper frame and extending rearwardly and upwardly through the upright frame, an upwardly directed detent on said frame, downwardly directed ratchet teeth on said bar to engage the same, and a tripping lever for releasing the ratchet bar from said detent.

21. In a rear dumping power shovel the combination with the dipper, the dipper frame and upright frame therefor, of a toothed rod secured to the dipper and extending through the upright frame, a detent on the upright frame to engage the teeth on said rod to support the dipper, and means releasing the rod from the detent.

22. In a device of the class described a rotating table, an upright frame thereon, a carriage slidably mounted on said upright frame, a dipper stick or frame pivotally mounted on said carriage at one end, a dipper mounted on said stick or frame, means adjusting the rear end of the dipper relatively of the front end thereof, and tackle for operating the dipper.

23. In a device of the class described a rotating table, an upright frame thereon, a vertically adjustable carriage slidably mounted on said upright frame, a dipper stick or frame pivotally mounted on said carriage at one end, means for adjusting the carriage as to height and a rear dumping dipper mounted near its front end on said stick or frame.

24. In a device of the class described a rotating table, an upright frame thereon, a carriage slidably mounted on said upright frame, a dipper stick or frame pivotally mounted on said carriage at one end, means adjusting the carriage vertically on said frame, a rear dumping dipper mounted near its front end on said dipper stick or frame, means adjusting the rear end of the dipper relatively of the front end thereof, tackle for operating the dipper, and means releasably supporting the dipper independent from said tackle.

25. In a device of the class described a rotating table, an upright frame thereon, a carriage mounted on said upright frame for vertical adjustment, means for adjusting the same, a dipper stick or frame pivotally mounted on said carriage at one end, a rear dumping dipper mounted near its front end on said stick or frame, a bail on the rear end of the dipper, a cable connected therewith, adjusting means on the frame with which the cable is connected for adjusting the rear end of the dipper relatively of the front end thereof, tackle for operating the dipper and means releasably supporting the front end of the dipper independent from said tackle.

26. In a device of the class described side sills affording ways, end sills adjustably connecting said side sills at their extremities and adjustable thereon to vary the length and the width of the frame thus formed, a revolving platform slidably engaged thereon, and a power shovel carried on said platform.

27. In a device of the class described parallel ways adapted to be secured to a car top, a frame slidably mounted on said ways, a rotatable platform mounted on said frame, a rack on the frame, a pinion carried on the platform and releasable means holding the pinion from movement to lock the platform on the frame.

28. In a device of the class described a rotatable table, an upright frame thereon, a carriage mounted on said frame, a dipper frame pivotally mounted on said carriage, a dipper mounted near its front end on said dipper frame, tackle for operating the dipper, ratchet bars pivotally engaged on the dipper frame and extending rearwardly and upwardly through the upright frame, a detent on said frame and means for releasing the ratchet bar from said detent.

29. In a device of the class described a horizontal frame, a rotatable platform mounted on said frame, a rack on the horizontal frame, a pinion carried on the platform, releasable means adapted to hold the pinion from movement to lock the platform to the frame, an upright frame secured on said rotating table, a carriage slidably mounted on said upright frame, a dipper frame pivotally mounted on said carriage, and a dipper mounted on said dipper frame.

30. In a device of the class described a horizontal frame, a rotatable platform mounted on said frame, a rack mounted on said frame, a pinion mounted on said platform, means releasably holding the pinion from movement on the rack to lock the platform to the frame, an upright frame secured on said rotating table, a carriage slidably mounted on said upright frame, a dipper frame pivotally mounted on said carriage, a dipper mounted on said dipper frame, a ratchet bar pivotally engaged on the dipper frame, a detent secured on the upright frame to engage the teeth on the ratchet bar and a tripping lever for releasing the ratchet bar from said detent.

31. In a device of the class described parallel ways, a revolving platform thereon, a power operated shovel carried on said platform, a hoisting engine, tackle operated thereby for moving said platform on its ways and releasable means independent of the hoisting engine for supporting the shovel in elevated position.

32. In a device of the class described a horizontal frame, a rotatable platform mounted on said frame, means releasably locking the platform to the frame, an upright frame secured on said rotating table, a carriage slidably mounted on said upright frame, a dipper frame pivotally mounted on said carriage, and a dipper mounted on said dipper frame.

33. In a device of the class described parallel ways, a revolving platform thereon, an upright frame on said rotatable table, a dipper frame secured thereto, a power operated dipper carried on said dipper frame, a hoisting engine, tackle operated thereby for moving said platform on its ways, tackle for operating the dipper, a toothed rod secured to the dipper frame and extending through the upright frame, a detent on said upright frame to engage the teeth on said rod to support the dipper, and means adapted to release the rod from the detent.

34. In a device of the class described a horizontal frame adjustable as to length and width, a rotatable platform mounted on said frame, means releasably locking the platform to the frame, an upright frame secured on said rotating table, a carriage adjustably mounted on said upright frame, a dipper frame pivotally mounted on said carriage, a dipper mounted on said dipper frame, means adjusting one end of the dipper relatively of the other, tackle for operating the dipper, and means releasably supporting the dipper independent from said tackle.

35. In a device of the class described a horizontal frame, a rotatable platform mounted on said frame, means releasably locking the platform to the frame, an upright frame secured on said rotating table, a carriage slidably mounted on said upright frame, a dipper frame pivotally mounted on said carriage, a dipper mounted on said dipper frame, means adjusting one end of the dipper relatively of the other end, tackle for operating the dipper, a ratchet bar pivotally secured to the dipper frame and extending upwardly and rearwardly through the upright frame, a detent on said upright frame adapted to engage the teeth on said ratchet bar to support the dipper and means adapted to release the rod from the detent.

36. In a device of the class described ways adapted to be secured on each sideboard of a car, end sills connecting the same, a frame mounted on said ways, a table rotatably connected therewith; an upright frame on said table, a carriage mounted on said upright frame, a dipper frame mounted on said carriage, a dipper mounted on said frame, means adjusting the rear end of the dipper relatively of the front end thereof, tackle for operating the dipper, means releasably supporting the dipper independent from said tackle embracing one or more bars pivotally engaged near the forward end of the dipper frame and extending rearwardly and upwardly through the upright frame, an upwardly directed detent on said frame, downwardly directed ratchet teeth on said bar to engage the same, and a tripping lever for releasing the ratchet bar from said detent.

37. In a device of the class described ways adapted to be secured on each sideboard of a car, end sills adjustably connecting the same, a frame slidably mounted on said ways, a rotating table releasably secured on said frame, an upright frame thereon, a slidable carriage mounted on said upright frame, a dipper mounted on said carriage at one end, a dipper mounted on said dipper frame, means adjusting the rear end of the dipper relatively of the front end thereof, tackle for operating the dipper, rack bars releasably supporting the dipper independent from said tackle, upwardly directed detents on said frame adapted to engage the rack bars and a tripping lever for releasing the rack bars from said detent.

38. A machine of the class described embracing a slidable frame, a platform mounted on said frame, means releasably locking the platform to the frame, an upright frame on said platform, an adjustable carriage mounted on said upright frame, a dipper frame pivotally mounted on said carriage, an independently supported hoisting engine, means connected with the frame to move the same longitudinally, means connected with the dipper to elevate the dipper and move the same laterally to dumping position and means engaged on the rotatable platform to return the dipper to filling position.

39. A machine of the class described embracing a frame, a rotatable platform mounted on said frame, means releasably locking the platform to the frame, a dipper carried on and operated from the rotatable platform, an independently supported hoisting engine, means connected with the frame to move the same longitudinally, means connected with the dipper to elevate the dipper and move the same laterally to dumping position, means engaged on the rotatable platform to return the dipper to filling position, a gin pole on each side of the machine and means connected therewith for lifting the machine and supporting the same above the ground.

40. A machine of the class described embracing side sills or ways adapted to be secured on each sideboard of a car, end sills adjustably connecting the same, a frame slidably mounted on said ways, a rotatable platform mounted on said frame and means releasably locking the platform to the frame.

41. In a device of the class described a rotating table, an upright frame thereon, a vertically adjustable carriage mounted on said upright frame, a dipper frame mounted on said carriage, a dipper mounted near its front end on said dipper frame, tackle for operating the dipper, means releasably supporting the dipper independent from said tackle and means for releasing said means.

42. A machine of the class described embracing ways adapted to be secured on each sideboard of a car, end sills adjustably connecting the same, clamps secured on each side sill to engage the same in place on the side of the car, tackle for rigidly engaging said sills from lifting, a frame slidably mounted on said ways, a rotatable platform mounted on said frame, means releasably locking the platform to the frame and a dipper carried on and operated from the rotatable platform.

43. A machine of the class described embracing ways adapted to be secured on each sideboard of a car, end sills adjustably connecting the same, a frame on said ways, a platform mounted on said frame, a dipper carried on the platform, a hoisting engine and means acting to elevate the platform and ways above the car and move the same laterally to clear the track.

44. In a device of the class described ways adapted to be removably secured on each side of a car, end sills adjustably connecting said ways and adjustable thereon to vary the length and width of the frame thus formed, a revolving platform thereon, a power shovel carried on said platform, and means for elevating and swinging the machine as a whole clear of the car.

45. A car unloading device embracing parallel ways, a rotatable platform slidably engaged thereon to move the length thereof, an upright frame secured upon said rotatable platform, an adjustable carriage upon said frame, means adapted to adjust the height of said carriage, a dipper frame mounted upon said carriage, a dipper mounted on said dipper frame, means for operating said dipper, means adapted to releasably support the dipper independently from said operating means and means adapted to be connected to move the table longitudinally of the ways.

46. A car unloading device embracing a frame adjustable as to length and width, a platform slidably engaged thereon to move the length thereof, a power shovel frame and its shovel carried on said platform, means connected to elevate the shovel and move the same laterally to dumping position, means for returning the shovel to filling position and means for releasably supporting the dipper independently from said actuating means.

47. In a device of the class described a frame adjustable as to length and width, a power shovel slidably mounted on said frame, means for shifting the shovel longitudinally on the frame, means for swinging the same laterally and means for elevating the machine as a whole.

48. In a device of the class described a frame adjustable as to length and width, a rotatable platform slidably engaged thereon and a power shovel carried on said platform and adapted to swing laterally of said frame.

In testimony whereof I have hereunto subscribed my name in the presence of two subscribing witnesses.

REA HOLLINGSWORTH.

Witnesses:
LAWRENCE REIBSTEIN,
CHARLES W. HILLS, Jr.